United States Patent
Kawai

(10) Patent No.: US 9,076,005 B2
(45) Date of Patent: Jul. 7, 2015

(54) IMAGE PROCESSING APPARATUS

(75) Inventor: Sunao Kawai, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 301 days.

(21) Appl. No.: 13/611,521

(22) Filed: Sep. 12, 2012

(65) Prior Publication Data

US 2013/0167202 A1    Jun. 27, 2013

(30) Foreign Application Priority Data

Dec. 22, 2011    (JP) ................................ 2011-280909

(51) Int. Cl.
  G06F 21/00    (2013.01)
  G06F 21/60    (2013.01)
  G06F 21/34    (2013.01)

(52) U.S. Cl.
  CPC .............. *G06F 21/606* (2013.01); *G06F 21/34* (2013.01)

(58) Field of Classification Search
  CPC ............................... G06F 21/606; G06F 21/34
  USPC ................................................. 726/4, 5, 6, 7
  See application file for complete search history.

(56) References Cited

U.S. PATENT DOCUMENTS

2011/0023102 A1    1/2011  Ikeda
2011/0107402 A1*   5/2011  Nagata .............................. 726/4

FOREIGN PATENT DOCUMENTS

| JP | 2006-167928 A | 6/2006 |
| JP | 2011-3102 A   | 1/2011 |
| JP | 2011-28577 A  | 2/2011 |

* cited by examiner

*Primary Examiner* — Brandon Hoffman
*Assistant Examiner* — Nega Woldemariam
(74) *Attorney, Agent, or Firm* — Scully, Scott, Murphy & Presser, P.C.

(57) ABSTRACT

An image processing apparatus includes: a first acquisition unit acquiring input information from an outside for starting execution of an image processing function; a determination unit determining whether a specific apparatus connected through a network is logged in based on specific identification information corresponding to the input information; a first request unit requesting input of authentication information from the outside; and a function control unit controlling execution of the image processing function. When it is determined that the specific apparatus is not logged in, the first request unit requests the input of the authentication information from the outside. When it is determined that the specific apparatus is logged in, the function control unit permits the execution of the image processing function without the first request unit requesting the input of the authentication information from the outside.

8 Claims, 7 Drawing Sheets

FIG. 2

141 MANAGEMENT SERVER STORAGE TABLE

| CARD ID | USER NAME | PC NODE NAME | PASSWORD |
|---|---|---|---|
| ABC1234 | User A | PC200 | 1111 |
| BCD3456 | User B | PC300 | 2222 |
| ZZZ9999 | User C | PC400 | 3333 |
| ⋮ | ⋮ | ⋮ | ⋮ |

IMAGE PROCESSING APPARATUS

CROSS-REFERENCE TO RELATED APPLICATIONS

This application claims priority from Japanese Patent Application No. 2011-280909 filed on Dec. 22, 2011, the entire subject matter of which is incorporated herein by reference.

TECHNICAL FIELD

The invention relates to an image processing apparatus configured to be connected to a specific apparatus through a network.

BACKGROUND

There have been proposed a technology of executing a function, which an image processing apparatus can execute, based on user authentication. Specifically, the image processing apparatus reads out authentication information from a storage medium such as IC card having the authentication information stored therein, and executes a function that the image processing apparatus can execute on a condition that authentication is permitted based on the authentication information. For example, when an IC card is touched on the information processing apparatus, a printing job is transmitted from a server to a printing apparatus.

SUMMARY

Illustrative aspects of the invention provide a technology executing a function of an image processing apparatus based on authentication, specifically, to provide a technology for improving usability of the image processing apparatus when executing the authentication.

According to one illustrative aspect of the invention, there is provided an image processing apparatus configured to be connected to a specific apparatus through a network, the image processing apparatus comprising: a processor; and a memory that stores computer program that, when executed by the processor, causes the image processing apparatus to function as: a first acquisition unit configured to acquire input information from an outside for starting execution of an image processing function; a determination unit configured to determine whether the specific apparatus is logged in based on specific identification information corresponding to the input information; a first request unit configured to request input of authentication information from the outside; and a function control unit configured to control execution of the image processing function. When it is determined that the specific apparatus is not logged in, the first request unit is configured to request the input of the authentication information from the outside. When it is determined that the specific apparatus is logged in, the function control unit is configured to permit the execution of the function that the image processing apparatus is configured to execute without the first request unit requesting the input of the authentication information from the outside.

BRIEF DESCRIPTION OF THE DRAWINGS

FIG. 2 shows information of a management server storage table that is stored in a management server;

DETAILED DESCRIPTION

General Overview

Figure 1:
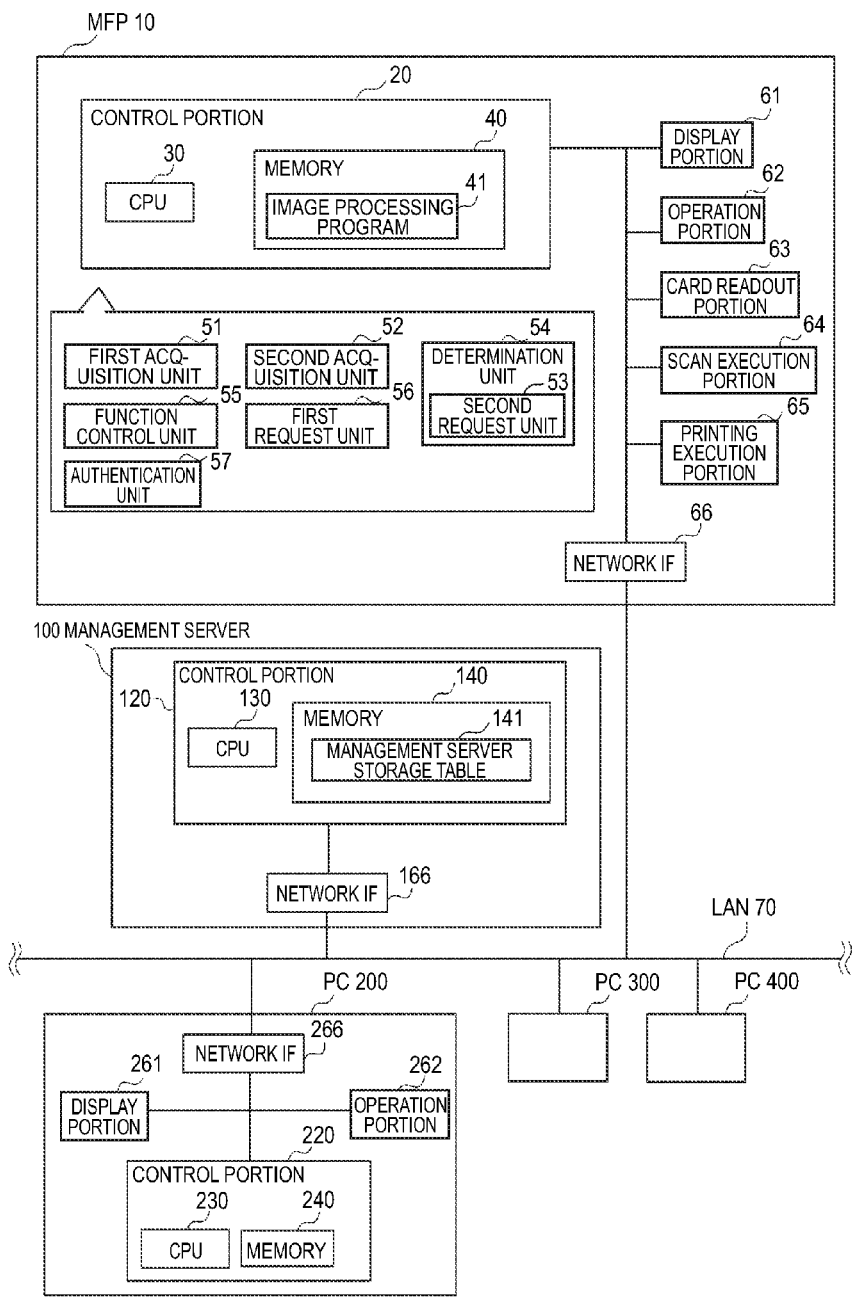
FIG. 1 is a block diagram showing a schematic configuration of a network system according to an exemplary embodiment.

However, according to the above-described related-art technology, when performing the user authentication by using the storage medium such as IC card, the authentication may be insufficient due to the loss of the IC card.

Therefore, illustrative aspects of the invention provide a technology executing a function of an image processing apparatus based on authentication, specifically, to provide a technology for improving usability of the image processing apparatus when executing the authentication.

According to a first illustrative aspect of the invention, there is provided an image processing apparatus configured to be connected to a specific apparatus through a network, the image processing apparatus comprising: a processor; and a memory that stores computer program that, when executed by the processor, causes the image processing apparatus to function as: a first acquisition unit configured to acquire input information from an outside for starting execution of an image processing function; a determination unit configured to determine whether the specific apparatus is logged in based on specific identification information corresponding to the input information; a first request unit configured to request input of authentication information from the outside; and a function control unit configured to control execution of the image processing function. When it is determined that the specific apparatus is not logged in, the first request unit is configured to request the input of the authentication information from the outside. When it is determined that the specific apparatus is logged in, the function control unit is configured to permit the execution of the function that the image processing apparatus is configured to execute without the first request unit requesting the input of the authentication information from the outside.

According thereto, when it is not determined that the specific apparatus is logged in, the request to the outside for the input of the authentication information is made. Therefore, it is possible to prevent the functions of the image processing apparatus from being illegally executed. On the other hand, when it is determined that the specific apparatus is logged in, the execution of the function, which can be executed by the image processing apparatus, is permitted without requesting the input of the authentication information. Therefore, when the specific apparatus is logged in, it is possible to omit the time for which the user inputs the password. As a result, it is possible to execute the functions of the image processing apparatus based on the authentication and to improve the usability of the image processing apparatus upon the authentication.

According to a second illustrative aspect of the invention, the specific identification information is user identification information that is information for identifying each user. When the user identification information is input in order to use the specific apparatus, the specific apparatus stores the input user identification information in the specific apparatus and proceeds to the logged-in state. The computer program that, when executed by the processor, causes the image processing apparatus to further function as a second acquisition unit which, when the input information is acquired from the outside, is configured to acquire the user identification information associated with the input information. The determination unit compares the user identification information stored in the specific apparatus with the user identification information acquired by the second acquisition unit, so as to determine whether the specific apparatus is logged in.

According thereto, the user identification information stored in the specific apparatus is compared with the user identification information acquired by the second acquisition unit, so that it is determined whether the specific apparatus is logged in. Therefore, it is possible to determine whether the logged-in state is made, based on the user identification information and to switch whether or not to permit the execution of the function for each user.

According to a third illustrative aspect of the invention, the specific identification information is associated with apparatus identification information for identifying the specific apparatus from a plurality of apparatuses comprising the specific apparatus. The determination unit specifies the specific apparatus from the plurality of apparatuses based on the apparatus identification information, and determines whether the specific apparatus is logged in.

According thereto, the specific apparatus is determined based on the apparatus identification information. Therefore, it is possible to appropriately identify the logged-in specific apparatus.

According to a fourth illustrative aspect of the invention, the specific identification information is stored in a server that is configured to be connected to the image processing apparatus through the network. The second acquisition unit acquires the specific identification information from the server.

According thereto, the specific identification information is acquired from the server. Therefore, it is possible to manage the specific identification information in the server, so that it is possible to suppress consumption of the memory of the image processing apparatus.

According to a fifth illustrative aspect of the invention, the determination unit comprises a second request unit configured to request the specific apparatus to transmit the specific identification information to the image processing apparatus.

According thereto, since the image processing apparatus requests the specific identification information from the specific apparatus, it is possible to reduce the processing load of the specific apparatus.

Incidentally, the invention can be implemented in a variety of aspects such as an image processing apparatus, a method that is executed in the image processing apparatus, a computer program or a computer-readable recording device for implementing functions of the method or apparatus and a recording medium having recorded the computer program.

Exemplary Embodiments

Exemplary embodiments of the invention will now described with reference to the drawings.

(Configuration of Network System)

FIG. 1 is a block diagram showing a schematic configuration of a network system according to an exemplary embodiment.

The network system includes an MFP (Multifunction Peripheral) 10, a management server 100 and PCs 200, 300, 400. The respective devices 10, 100, 200, 300, 400 are connected to each other through a LAN (Local Area Network) 70. Regarding the LAN 70, a LAN that is established on a specific floor and the like in a company may be used. That is, the LAN 70 is a LAN to which the MFP 10 is connected to receive an instruction from the PC 200 so as to execute a specific function.

Incidentally, in FIG. 1, the three PCs (PCs 200, 300, 400) are connected to the LAN 70. However, any PCs may be connected to the LAN 70. The LAN 70 may be configured by any of a wired network and a wireless network using an access point or may be configured by both the wired and wireless networks.

(Configuration of MFP)

The MFP 10 includes a control portion 20, a display portion 61, an operation portion 62, a card readout portion 63, a scan execution portion 64, a printing execution portion 65 and a network interface 66, each of which is connected to a bus line. The network interface 66 is connected to the LAN 70.

The control portion 20 includes a CPU 30 and a memory 40. The memory 40 stores therein an image processing program 41. The CPU 30 executes processing in response to the image processing program 41. The CPU 30 executes the processing in response to the image processing program 41, so that functions of respective unit 51 to 57 are implemented. Incidentally, the memory 40 includes one or more storage media of a plurality of storage media such as a ROM, a RAM, a hard disk and the like.

The display portion 61 is provided with a panel and is configured to display a variety of screens. In this exemplary embodiment, the display portion 61 is a touch panel and also serves as the operation portion 62. A user can select an item displayed on the display portion 61 by pressing a specific area of the display portion 61 with a finger.

The operation portion 62 is configured by a plurality of buttons. A user can operate the operation portion 62 to select an item displayed on the display portion 61. That is, the user can input an instruction to the MFP 10 by pressing the display portion 61 with a finger or by operating the operation portion 62.

The card readout portion 63 is configured to read out identification information (hereinafter, referred to as card ID) stored in an IC card having an IC tag embedded therein. The user places the IC card near the card readout portion 63 to transmit the card ID stored in the IC card to the MFP 10.

The scan execution portion 64 includes a readout bar having a plurality of sensors configured by a CCD and the like and a moving part for moving the readout bar so as to read out data of a document placed on a platen. Alternatively, the scan execution portion 64 may have a readout bar and a conveyance part for conveying a document.

The printing execution portion 65 includes a printing mechanism such as laser type and the like. The control portion 20 may control the printing execution portion 24 to print the scan data scanned by the scan execution portion 64.

Further, the control portion 20 may transmit the scan data to the other device through the LAN 70 connected to the network interface 66.

(Configuration of Management Server)

The management server 100 includes a control portion 120 and a network interface 166, which are respectively connected to the bus line. The network interface 166 is connected to the LAN 70.

The control portion 120 includes a CPU 130 and a memory 140. The memory 140 stores therein the management server storage table 141.

FIG. 2 shows information of the management server storage table 141 that is stored in the memory 140 of the management server 100. The management server storage table 141 includes information about a card ID, a user name, a PC node name and a password. For example, in the card ID 'ABC1234', the user name 'User A', the PC node name 'PC 200' and the password '1111' are associated each other. Although specifically described later, it is assumed that the IC card, which is used to read out the card ID by the card readout portion 63 of the MFP 10, is possessed by one user. In this exemplary embodiment, the management server 100 associates and manages the user name for identifying one user and the PC node name of the PC that is used by the one user. The associated information is used to determine whether or not to permit executing the function of the MFP 10. In order to use the function that can be executed by the MFP 10, one user is asked to input the password for a specific case. Therefore, the management server 100 associates and manages the one user name and the password.

(Configuration of PC)

The PC 200 includes a control portion 220, a display portion 261, an operation portion 262 and a network interface 266, which are respectively connected to the bus line. The network interface 266 is connected to the LAN 70.

The control portion 220 includes a CPU 230 and a memory 240.

The display portion 261 includes a display and is configured to display a variety of screens. The operation portion 262 includes a keyboard or pointing device. A user operates the operation portion 262 to select an item that is displayed on the display portion 261.

(Outline of Image Processing)

In the below, an outline of the image processing that is executed in this exemplary embodiment will be described.

An outline of the image processing of this exemplary embodiment is described. The MFP 10 can execute any one of a plurality of functions (e.g., printing, copying, scan and facsimile functions) as the image processing.

In this exemplary embodiment, a user can place the IC card near the card readout portion 63, so as to instruct the MFP 10 to execute any one of the functions that can be executed by the MFP 10, for a specific case. Specifically, when a user places the IC card near the card readout portion 63, the MFP 10 determines whether the user who is a possessor of the IC card has already logged in an apparatus (for example, PC 200), which is connected to the MFP 10 through the LAN 70, by using the user name of the user.

The user operates the operation portion 262 of the PC 200 to input the user name and the password so as to use the PC 200. When the password input by the user coincides with the password to be input, the PC 200 stores the user name input by the user in the memory 240 and permits using the PC 200 (that is, the PC proceeds to a logged-in state). By storing the user name in the memory 240, the PC 200 can specify the user who has enabled the PC to shift to the logged-in state.

When instructing the MFP 10 to execute the function thereof, if it is determined that the user has already enabled the PC 200 to the logged-in state by using the user name of the user, the user can execute any one of the functions that can be executed by the MFP 10, without inputting the information of the user name and password.

(Image Processing that is Executed in MFP)

Figure 3:
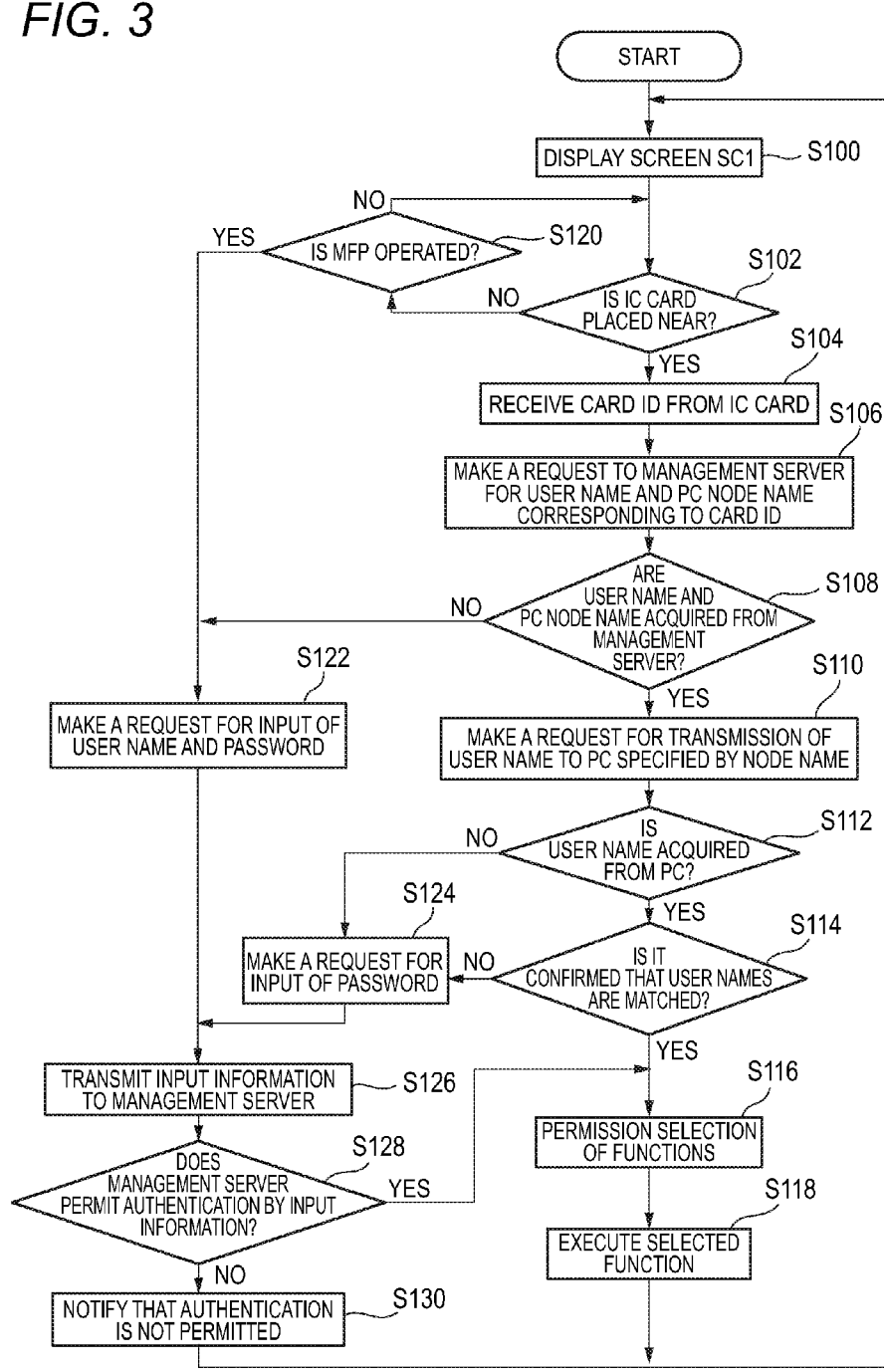
FIG. 3 shows a flowchart of image processing that is executed by an MFP.

FIG. 3 is a flowchart showing the image processing that is executed by the MFP 10.

The image processing starts when the user performs an operation for supplying the power to the MFP 10. When the power supply is turned on, a first acquisition unit 51 displays a standby screen SC1 on the display portion 61 (S100).

Figure 4:
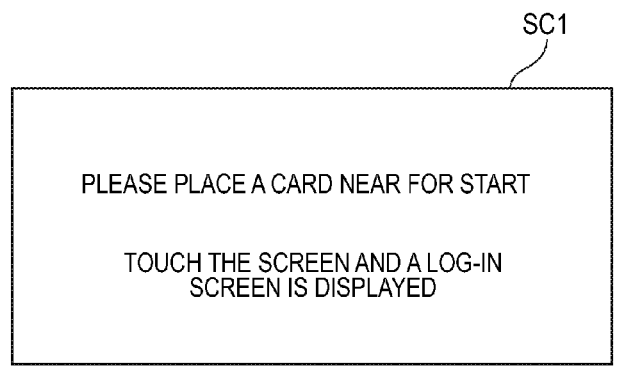
FIG. 4 shows one example of a standby screen.

FIG. 4 shows the standby screen SC1 that is displayed on the display portion 61 when the power supply is on. At a state where the standby screen SC1 is displayed, the user is unable to instruct the MFP 10 to execute the function.

The first acquisition unit 51 determines whether the user places the IC card near the card readout portion 63 (S102).

When it is not determined that the IC card is placed near the card readout portion 63 (S102: NO), the first acquisition unit 51 determines whether the MFP 10 is operated by the user (S120). Specifically, the first acquisition unit 51 determines whether the user presses the standby screen SC1 with a finger. When it is determined that the MFP 10 is operated by the user (S120: YES), the processing proceeds to S122. On the other hand, when it is not determined that the MFP 10 is operated by the user (S120: NO), the processing again proceeds to S102.

When it is determined that the IC card is placed near the card readout portion 63 (S102: YES), the first acquisition unit 51 receives the information of the card ID from the IC card (S104). Thereby, the first acquisition unit 51 can specify the IC card placed near the card readout portion 63.

Subsequently, a second acquisition unit 52 requests the management server 100 to transmit the information of the user name corresponding to the received card ED and the information of the PC node name corresponding to the received card ID (S106). As described above, the management server 100 stores therein the management server storage table 141. The second acquisition unit 52 requests the user name corresponding to the card ID and the PC node name corresponding to the card ID, which are included in the management server storage table 141, from the management server 100.

The second acquisition unit 52 determines whether the information of the user name and PC node name is acquired from the management server 100 (S108). The second acquisition unit 52 acquires the information of the user name and PC node name from the management server 100, thereby specifying the user possessing the IC card and the PC that is used by the user (e.g., the PC that the user is assumed to log in by using the user name of the user).

More specifically, when the PC node name is received from the management server 100, the second acquisition unit 52 transmits the information of the PC node name to a DNS server (not shown) that is connected through the LAN 70. The DNS server specifies an IP address corresponding to the PC node name (e.g., executes a name solution) and transmits the IP address to the MFP 10. Thereby, the second acquisition unit 52 can specify the PC that is possessed by the user.

When the information of the user name and PC node name is not acquired (S108: NO), the processing proceeds to S122. Incidentally, when a result of the determination in S108 is NO, a case is for example considered in which the user name corresponding to the card ID is not registered in the management server storage table 141.

On the other hand, when the information of the user name and PC node name is acquired (S108: YES), a second request unit 53 requests the PC that is indicated by the acquired PC node name (S110) to transmit the information indicative of the user name. In the below, it is assumed that the PC indicated by the acquired PC node name is the PC 200.

A determination unit 54 determines whether the information indicative of the user name is acquired from the PC 200 (S112). When the user name is not acquired from the PC 200 (S112: NO), the processing proceeds to S124. Incidentally, when a result of the determination in S112 is NO, following two cases are considered, for example. That is, (1) a case where the power is not supplied to the PC 200 and (2) a case where the IP address corresponding to the PC node name (e.g., the PC node name stored in the management server storage table 141, as the PC node of the PC 200) transmitted from the management server in S108 and the IP address of the PC 200 are different from each other may be considered. In case of (2), the result of the determination in S112 is NO for a case where there is no apparatus having an IP address corresponding to the PC node name transmitted from the management server 100 or a case where the power supply of the corresponding apparatus is not on.

On the other hand, when the information indicative of the user name is acquired from the PC 200 (S112: YES), the determination unit 54 determines whether the user name acquired from the management server 100 in S108 coincides with the user name acquired from the PC 200 in S112 (S114). When the two user names do not coincide with each other (S114: NO), the processing proceeds to S124. Incidentally, when a result of the determination in S114 is NO, a case where the user name (e.g., user name corresponding to the card ID) requested from the management server 10 in S106 and the user name of the user having logged in the PC 200 are different from each other may be considered. In other words, when the result of the determination in S114 is NO, a case where the PC 200 is being logged-in using a user ID other than the user ID corresponding to the IC card placed near the card readout portion 63 in S102 may be considered.

On the other hand, when the determination unit 54 confirms that the user names are matched (S114: YES), it is determined that the PC 200 is being logged-in using the user ID. Therefore, a function control unit 55 allows the user to select the function of the MFP 10 so as to execute the function of the MFP 10 (S116). That is, the function control unit 55 displays a screen (not shown) for selecting the execution of the functions of the MFP 10 on the display portion 61, instead of the standby screen SC1 of FIG. 4. The user can select a desired function to be executed by using the operation portion 62.

Incidentally, when the selectable functions are limited for each user, the function control unit 55 permits the selection of any one function that is included in the limited functions. For example, when the function that can be selected by a specific user is any one of the 'printing function' and the 'scan function' of the plurality of functions (e.g., printing, copying, scan and facsimile functions), the function control unit 55 displays a screen (not shown), which enables any one of the two functions to be selected, on the display portion 61.

Subsequently, the function control unit 55 executes the function selected by the user (S118). When the execution of the function is done and the user selects that the execution of the function is done in the screen (not shown) for selecting the execution of the functions of the MFP 10, the first acquisition unit 51 again displays the standby screen SC1 on the display portion 61 (S100).

In S120, when the user presses the standby screen SC1 with a finger to operate the MFP 10 (S120: YES), a first request unit 56 displays a log-in screen (not shown) on the display portion 61, instead of the standby screen SC1, thereby requesting the user to input the user name and the password (S122). The user can input the user name and the password by using the operation portion 62.

Also, S108, when the information indicative of the user name and the PC node name is not acquired from the management server 100 (S108: NO), the first request unit 56 requests the user to input the user name and the password (S122).

Figure 5:
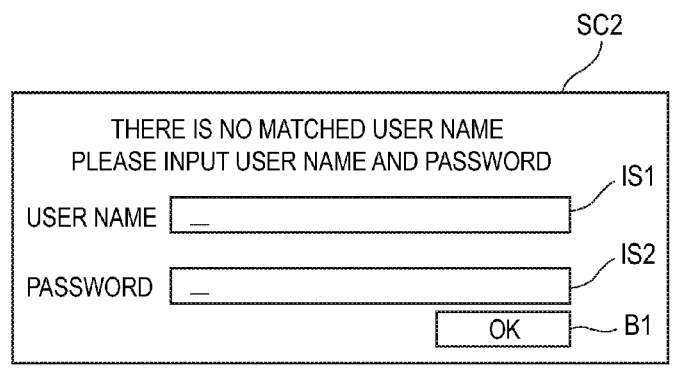
FIGS. 5 to 7 show examples of input screens.

FIG. 5 shows an input screen SC2 that is displayed on the display portion 61 in S122 when a result of the determination in S108 is NO. By displaying the input screen SC2, the user can recognize that the user name corresponding to the card ID has not been registered in the management server storage table 141. As shown in FIG. 5, the input screen SC2 includes an area IS1 for inputting a user name, an area IS2 for inputting a password and a completion button B1 for notifying completion of the inputs. The user can input the user name in the area IS of the input screen SC2 and the password in the area IS2, and then the user can select the completion button B1 by using the operation portion 62.

When the user name and the password are input in S122, an authentication unit 57 transmits the user name and the password, which are input by the user, to the management server 100 (S126). The authentication unit 57 determines whether the management server 100 permits authentication by the user name and the password transmitted to the management server 100 (S128). Specifically, the authentication unit 57 determines whether the information, which indicates that the password stored in the management server storage table 141 matches the password input by the user and the authentication is thus permitted, is received from the management server 100.

When the information indicating that the authentication is permitted is received from the management server 100 (S128: YES), the function control unit 55 permits the user to select the functions of the MFP 10 no as to execute the functions of the MFP 10, as described above (S116). Subsequently, the function control unit 55 executes the function selected by the user (S118). When the execution of the function is done and the user selects that the execution of the function is done in the screen (not shown) for selecting the execution of the functions of the MFP 10, the first acquisition unit 51 again displays the standby screen SC1 on the display portion 61 (S100).

On the other hand, when the information indicating that the authentication is not permitted is received from the management server 100 (S128: NO), the authentication unit 57 notifies the information indicating that the authentication is not permitted (S130). Specifically, the authentication unit 57 displays a screen (not shown), which indicates that the authentication is not permitted, on the display portion 61. Then, the first acquisition unit 51 again displays the standby screen SC1 on the display portion 61 (S100).

In S112, when a reply of the user name from the PC 200 is not confirmed (S112: NO), the first request unit 56 requests the user to input the password (S124).

Figure 6:
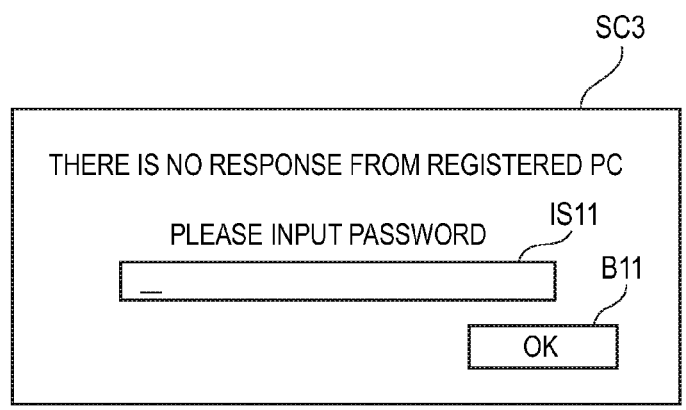

FIG. 6 shows an input screen SC3 that is displayed on the display portion 61 in S124 when a result of the determination in S112 is NO. By displaying the input screen SC3, the user can recognize that the user name is not replied from the PC 200. As shown, the input screen SC3 includes an area IS11 for inputting a password and a completion button B11 for notifying completion of the input. The user can input the password in the area IS11 of the input screen SC3 and then select the completion button B11 by using the operation portion 62.

Also, in S114, when it is not confirmed that the user names are matched (S114: NO), the first request unit 56 requests the user to input the password (S124).

Figure 7:
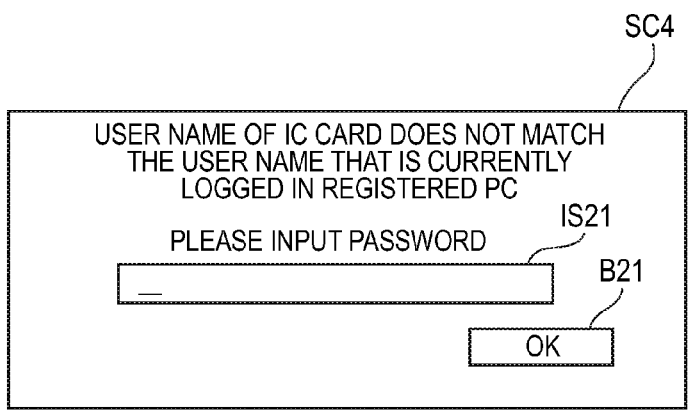

FIG. 7 shows an input screen SC4 that is displayed on the display portion 61 in S124 when a result of the determination in S114 is NO. By displaying the input screen SC4, the user can recognize that the user name acquired from the management server 100 and the user name acquired from the PC 200 are not matched. As shown, the input screen SC4 includes an area IS21 for inputting a password and a completion button B21 for notifying completion of the password input. The user can input the password in the area IS21 of the input screen SC4 and then select the completion button B21 by using the operation portion 62.

When the password is input in S124, the authentication unit 57 transmits the password input by the user to the management server 100 together with the user name acquired from the management server 100 in S108 (S126). The authentication unit 57 determines whether the management server 100 permits the authentication by the information transmitted to the management server 100 (S128). Specifically, the authentication unit 57 determines whether the information, which indicates that the password included in the management server storage table 141 matches the password input by the user and the authentication is thus permitted, is received from the management server 100.

When the information indicating that the authentication is permitted is received from the management server 100 (S128: YES), the function control unit 55 permits the user to select the functions of the MFP 10 so as to execute the functions of the MFP 10, as described above (S116). Subsequently, the function control unit 55 executes the function selected by the user (S118). When the execution of the function is done and the user selects that the execution of the function is done in the screen (not shown) for selecting the execution of the functions of the MFP 10, the first acquisition unit 51 again displays the standby screen SC1 on the display portion 61 (S100).

On the other hand, when the information indicating that the authentication is not permitted is received from the management server 100 (S128: NO), the authentication unit 57 notifies the information indicating that the authentication is not permitted (S130). Specifically, the authentication unit 57 displays a screen (not shown), which indicates that the authentication is not permitted, on the display portion 61. Then, the first acquisition unit 51 again displays the standby screen SC1 on the display portion 61 (S100).

As described above, the MFP 10 continuously executes the processing from S100 to S130.

(Image Processing Executed in Management Server)

Figure 8:
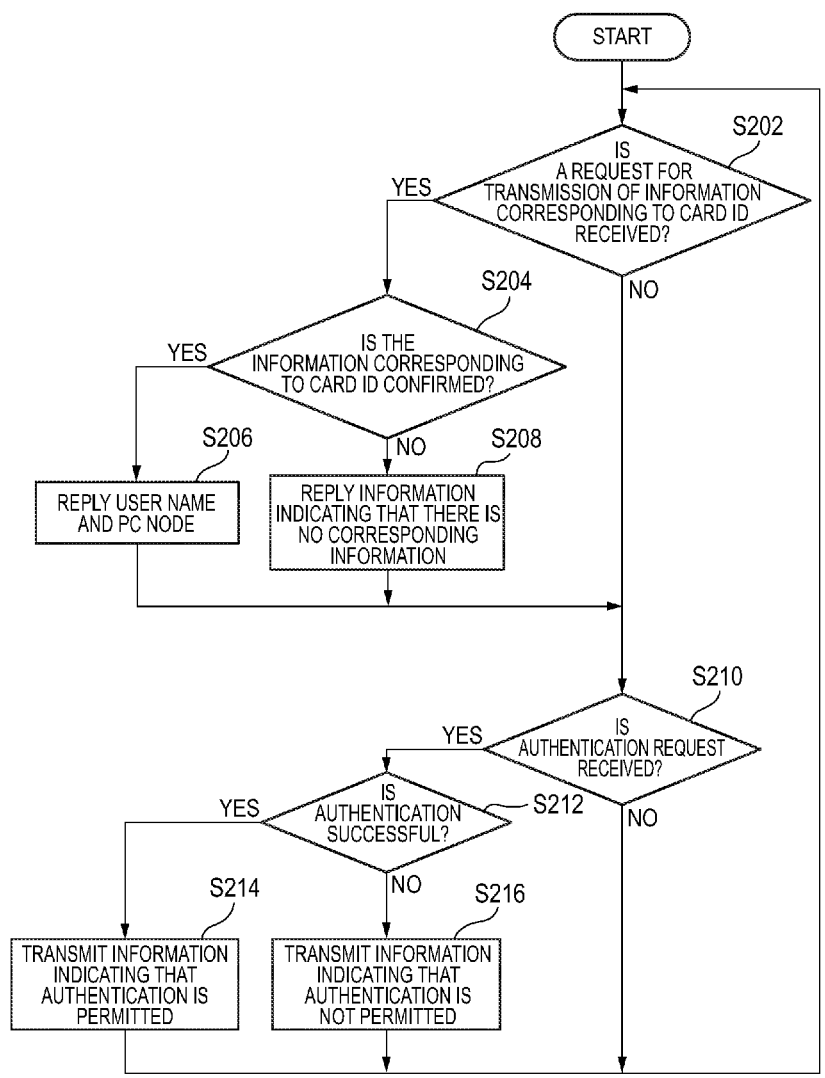
FIG. 8 shows a flowchart of image processing that is executed by the management server.

FIG. 8 shows a flowchart of the image processing that is executed by the management server 100.

The control portion 120 of the management server determines whether the MFP 10 requests the transmission of the information (e.g., user name, PC node name) corresponding to the card ID (S202). This processing corresponds to the processing of receiving the request from the MFP 10 in S106 of FIG. 3. When it is determined that the request for the information corresponding to the card ID is not received from the MFP 10 (S202: NO), the control portion 120 proceeds to S210.

On the other hand, when it is determined that the request for the transmission of the information corresponding to the card ID is received from the MFP 10 (S202: YES), the control portion 120 refers to the management server storage table 141 stored in the memory 140 of the management server 100 and determines whether there is the information corresponding to the card ID (S204).

When there is the information corresponding to the card ID in the management server storage table 141 (S204: YES), the control portion 120 transmits the user name and PC node name corresponding to the card ID to the MFP 10 (S206). On the other hand, when the information corresponding to the card ID is not stored (S204: NO), the control portion 120 transmits information indicating that there is no information corresponding to the card ID to the MFP 10 (S208).

Subsequently, the control portion 120 determines whether the authentication request is received (S210). This processing corresponds to the case where the information indicative of the user name and password is received from the MFP 10 in S126 of FIG. 3. When it is determined that the authentication request is not received from the MFP 10 (S210: NO), the control portion 120 proceeds to S202.

On the other hand, when it is determined that the authentication request is received from the MFP 10 (S210: YES), the control portion 120 determines whether the authentication is successful (S212). Specifically, the control portion 120 refers to the management server storage table 141 and determines whether the password received from the MFP 10 matches the password, which is stored in the management server 141 in association with the user name received from the MFP 10.

When the two passwords are matched (S212: YES), the control portion 120 transmits the information indicating that the authentication is permitted to the MFP 10 (S214). On the other hand, when the two passwords are not matched (S212: NO), the control portion 120 transmits the information indicating that the authentication is not permitted to the MFP 10 (S216).

As described above, the control portion 120 of the management server 100 continuously monitors whether the request for the transmission of the information corresponding to the card ID is received from the MFP 10 and whether the authentication request is received from the MFP. The control portion 120 alternately executes the processing of S202 and S210 when no request is received.

When the request for the transmission of the information corresponding to the card ID is received, the control portion 120 executes the processing of S204 to S208. On the other hand, when the authentication request is received, the control portion 120 executes the processing of S212 to S216.

(Image Processing Executed in PC)

Figure 9:
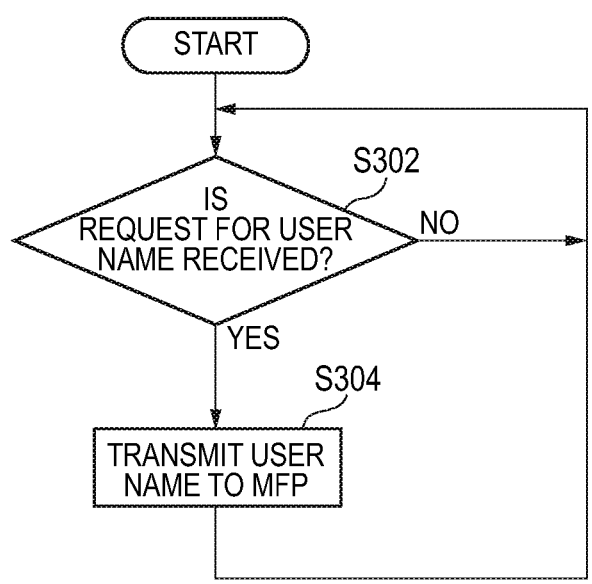
FIG. 9 shows a flowchart of image processing that is executed by a PC.

FIG. 9 shows a flowchart of the image processing that is executed by the PC 200.

Incidentally, as described above, the user operates the operation portion 262 of the PC 200 to input the user name and the password in order to use the PC 200. When the password input by the user matches the password to be input, the PC 200 stores the information indicative of the user name input by the user in the memory 240 and permits the user to use the PC 200 (that is, the PC proceeds to the logged-in state). The image processing of FIG. 9 is executed when a specific user logs in the PC 200.

The control portion 220 of the PC 200 determines whether the request for the transmission of the user name is received from the MFP 10 (S302). This processing corresponds to S110 of FIG. 3. When the request for the transmission of the user name is received from the MFP 10 (S302: YES), the control portion 220 transmits the information indicative of the user name (e.g., the user name that is currently logged in the PC 200) stored in the memory 240 to the MFP 10 (S304).

As described above, the MFP 10 that is connected to the PC 200 through the LAN 70 acquires the card ID for activating the execution of the functions from the IC card by S104 of the image processing in FIG. 3.

In S108, the MFP 10 acquires the user name corresponding to the card ID. Also, in S108, the MFP 10 acquires the PC node name of the PC 200 from the management server 100. In S110, the MFP 10 acquires the user name of the user who logs in the PC 200 from the PC 200 indicated by the PC node name. In S114, the MFP 10 compares the user name acquired from the management server 100 with the user name acquired from the PC 200 and determines whether the PC 200 is logged-in using the user name.

When it is not determined that the PC 200 is logged in, the MFP 10 requests the input of the password in S124. Accordingly, it is possible to prevent unauthorized use of the functions of the MFP 10.

Further, when it is determined that the PC 200 is logged in, the MFP 10 permits the execution of the function in S116. Therefore, when the PC 200 is logged in, it is possible to omit the time for which the user inputs the password.

Further, the management server 100 associates and stores the user name and the PC node name in the management server storage table 141. Thus, when the PC 200 is logged-in using the user name, it is possible to enable the MFP 10 to recognize that the user logs in the PC 200.

Incidentally, the MFP 10 is one example of the image processing apparatus. The PC 200 is one example of the specific apparatus. The card ID is one example of the input information. The password is one example of the authentication information. The user name is one example of the user identification information. The PC node name is one example of the apparatus identification information.

Modifications to Exemplary Embodiments

The technical scope of the invention is not limited to the above exemplary embodiment and can be implemented by a variety of aspects as described below.

(1) In the above-described exemplary embodiment, it is determined whether the logged-in state is made, depending on whether the user name acquired from the management server 100 in S108 of FIG. 3 coincides with the user name stored in the memory 240 of the PC 200. However, the other configuration is also possible. For example, a card ID may be stored in the memory 240 of the PC 200, and it may be determined whether the logged-in state is made by comparing the card ID acquired from the IC card with the card ID stored in the PC 200. By doing so, it is possible to determine whether the logged-in state is made, without using the user name.

(2) In the above-described exemplary embodiment, in S110 of FIG. 3, the MFP is requested to transmit the user name to the PC (PC 200) that is indicated by the PC node name acquired from the management server 100. However, the other configuration is also possible. For example, it may be possible to determine whether the PC 200 is logged in, without referring the PC node name to the management server 100 (e.g., without executing the processing of S106 of FIG. 3). Specifically, when the PC 200 is logged in by a specific user, the PC 200 may notify the MFP 10 of the user name, so as to notify that the PC 200 is logged in by the user name. By doing so, the MFP 10 can determine whether a specific PC is logged in by a user, without using the PC node name. The above configuration is suitable for a case where only one PC is connected to the MFP 10 through the network. Further, in S110 of FIG. 3, it may be possible to determine whether any one PC connected to the LAN 70 is logged in, without the request for the transmission of the user name to the PC. By doing so, the MFP 10 can determine whether a user logs in any one apparatus, without using the user name. The above configuration is suitable for a case where only one person can log in an apparatus connected to the LAN 70 (in other words, a user other than the corresponding user cannot log in any apparatus).

Further, when a log-in management server (not shown), which associates and manages the PC node name and the user name logging in the apparatus indicated by the PC node name, is connected to the LAN 70, the MFP 10 may transmit the information indicative of the user name to the log-in management server in order to specify whether a specific user logs in any one apparatus by using a user name of the specific user. In this case, the log-in management server determines whether any one apparatus is logged-in using the user name and transmits the information, which indicates whether any one apparatus is logged in, to the MFP 10. By doing so, the MFP 10 can determine whether the specific user logs in any one apparatus, without using the PC node name.

Further, in the above-described exemplary embodiment, the PC is specified using the PC node name. Alternatively, the PC may be specified using the other identifiers such as MAC address.

(3) In the above-described exemplary embodiment, in S110 of FIG. 3, the MFP 10 requests the user name from the PC 200. However, the other configuration is also possible. For example, when the user operates the operation portion 262 of the PC 200 to log in the PC 200, the control portion 230 of the PC 200 may transmit the user name to the MFP 10. By doing so, the MFP 10 can determine whether the PC is logged in, without referring to the PC 200.

(4) In the above-described exemplary embodiment, the management server 100 is connected to the MFP 10. However, the other configuration is also possible. For example, when the MFP 10 stores the management server storage table 141, the MFP 10 can acquire the user ID and the PC node name from the memory 40, so that it is not necessary to provide the management server 100. Further, the MFP 10 can compare the password stored in the memory 40 with the password input by the user for executing the authentication processing, so that it is not necessary to provide the management server 100.

(5) In the above-described exemplary embodiment, the management server 100 stores the management server storage table 141 in the memory 140. Alternatively, the MFP 10 and an authentication server may be connected through the LAN 70. In this case, the management server 100 stores the card ID, the user name and the PC node name of the information included in the management server storage table 141, for example, and executes the processing of S202 to S208 in FIG. 8. The authentication server stores the user name and the password of the information included in the management server storage table 141, for example, and executes the processing of S210 to S216 in FIG. 8. By doing so, it is possible to distribute the processing load of the management server 100.

(6) In the above-described exemplary embodiment, it is determined whether the logged-in state is made with using the IC card. However, the other configuration is also possible. For example, the identification information may be read in from a terminal apparatus such as PDA capable of performing NFC (Near Field Communication), which is a kind of near wireless communication standards. Further, the identification information may be read in by biometric authentication, linear barcode, two-dimensional barcode, and so on.

(7) In the above-described exemplary embodiment, the CPU 30 executes the processing in response to the image processing program 41, so that the functions of the respective unit 51 to 58 are implemented. Alternatively, at least one of the respective unit 51 to 58 may be implemented by hardware such as logical circuit.

(8) In the above-described exemplary embodiment, the MFP 10 has been exemplified as the image processing apparatus. However, the image processing apparatus may be an apparatus that can execute at least one of the functions (e.g., printing, copying, scan and facsimile functions). For example, a printing apparatus capable of executing the printing function only may be also used.

What is claimed is:

1. An image processing apparatus configured to be connected to a specific apparatus through a network, the image processing apparatus comprising:
  a processor; and
  a memory that stores a computer program that, when executed by the processor, causes the image processing apparatus to function as:
    a first acquisition unit configured to acquire input information from an outside for starting execution of an image processing function;
    a determination unit configured to determine whether the specific apparatus is logged in based on specific identification information corresponding to the input information;
    a first request unit configured to request input of authentication information from the outside; and
    a function control unit configured to control execution of the image processing function,
  wherein when it is determined that the specific apparatus is not logged in, the first request unit is configured to request the input of the authentication information from the outside, and
  wherein when it is determined that the specific apparatus is logged in, the function control unit is configured to permit the execution of the image processing function without the first request unit requesting the input of the authentication information from the outside.

2. The image processing apparatus according to claim 1,
  wherein the specific identification information is user identification information that is information for identifying each user,
  wherein when the user identification information is input in order to use the specific apparatus, the specific apparatus stores the input user identification information in the specific apparatus and proceeds to the logged-in state,
  wherein the computer program that, when executed by the processor, causes the image processing apparatus to further function as a second acquisition unit which, when the input information is acquired from the outside, is configured to acquire the user identification information associated with the input information, and
  wherein the determination unit compares the user identification information stored in the specific apparatus with the user identification information acquired by the second acquisition unit, so as to determine whether the specific apparatus is logged in.

3. The image processing apparatus according to claim 1,
  wherein the specific identification information is associated with apparatus identification information for identifying the specific apparatus from a plurality of apparatuses comprising the specific apparatus, and
  wherein the determination unit specifies the specific apparatus from the plurality of apparatuses based on the apparatus identification information, and determines whether the specific apparatus is logged in.

4. The image processing apparatus according to claim 2,
  wherein the specific identification information is stored in a server that is configured to be connected to the image processing apparatus through the network, and
  wherein the second acquisition unit acquires the specific identification information from the server.

5. The image processing apparatus according to claim 1,
  wherein the determination unit comprises a second request unit configured to request the specific apparatus to transmit the specific identification information to the image processing apparatus.

6. A non-transitory computer-readable medium having a computer program stored thereon that, when executed by a computer, which is configured to be connected to a specific apparatus through a network, causes the computer to perform operations comprising:
  a first acquisition process of acquiring input information from an outside, which is necessary to start execution of an image processing function;
  a determination process of determining whether the specific apparatus is logged in based on specific identification information corresponding to the input information;
  a first request process of requesting input of authentication information from the outside; and
  a function control process of controlling execution of the image processing function,
  wherein when it is determined that the specific apparatus is not logged in, the first request process is configured to request the input of the authentication information from the outside, and
  wherein when it is determined that the specific apparatus is logged in, the function control process is configured to permit the execution of the image processing function without requesting the input of the authentication information from the outside.

7. The image processing apparatus according to claim 1,
  wherein the function control unit is configured to control execution of a plurality of image processing functions, and
  wherein the function control unit is configured to permit to control execution of one or more of the plurality of image processing functions based on the authentication.

8. An image processing apparatus configured to be connected to a specific apparatus through a network, the image processing apparatus comprising:
  a processor; and
  a memory that stores a computer program that, when executed by the processor, causes the image processing apparatus to function as:
    a first acquisition unit configured to acquire input information from an outside for starting execution of an image processing function;
    a determination unit configured to determine whether the specific apparatus is logged in based on specific identification information corresponding to the input information;
    a first request unit configured to request input of authentication information from the outside; and
    a function control unit configured to control execution of the image processing function,
  wherein when it is determined that the specific apparatus is not logged in, the first request unit is configured to request the input of the authentication information from the outside, and
  wherein when it is determined that the specific apparatus is logged in, the function control unit is configured to permit the execution of the image processing function without the first request unit requesting the input of the authentication information from the outside;
  wherein the specific identification information is associated with apparatus identification information for identifying the specific apparatus from a plurality of apparatuses comprising the specific apparatus,
  wherein the determination unit specifies the specific apparatus from the plurality of apparatuses based on the apparatus identification information, and determines whether the specific apparatus is logged in, and wherein the determination unit comprises a second request unit configured to request the specific apparatus to transmit the specific identification information to the image processing apparatus.

* * * * *